(12) United States Patent
Fennington, Jr.

(10) Patent No.: US 7,373,825 B2
(45) Date of Patent: May 20, 2008

(54) GAUGE TEE DEVICE

(76) Inventor: George J Fennington, Jr., 7 Chalden Ct., Huntington Station, NY (US) 11746

( * ) Notice: Subject to any disclaimer, the term of this patent is extended or adjusted under 35 U.S.C. 154(b) by 0 days.

(21) Appl. No.: 11/437,479

(22) Filed: May 18, 2006

(65) Prior Publication Data

US 2007/0001447 A1   Jan. 4, 2007

Related U.S. Application Data

(60) Provisional application No. 60/683,091, filed on May 20, 2005.

(51) Int. Cl.
*G01L 7/00* (2006.01)
(52) U.S. Cl. .......................... 73/700; 73/706
(58) Field of Classification Search .......... 73/700–756
See application file for complete search history.

(56) References Cited

U.S. PATENT DOCUMENTS

| | | | |
|---|---|---|---|
| 4,539,998 A * | 9/1985 | McCord et al. | 600/488 |
| 4,576,181 A | 3/1986 | Wallace et al. | |
| RE33,518 E * | 1/1991 | McCord et al. | 600/488 |
| 5,000,049 A | 3/1991 | Cooper et al. | |
| 6,117,086 A | 9/2000 | Shulze | |
| 6,886,411 B2 * | 5/2005 | Kjellman et al. | 73/756 |
| 6,978,636 B2 | 12/2005 | Motush et al. | |
| 7,017,416 B1 * | 3/2006 | Liu et al. | 73/702 |

FOREIGN PATENT DOCUMENTS

EP   624795 A2 *   11/1994

* cited by examiner

*Primary Examiner*—Edward Lefkowitz
*Assistant Examiner*—Jermaine Jenkins
(74) *Attorney, Agent, or Firm*—Kenneth I. Kohn; Kohn & Associates, PLLC (57) ABSTRACT

A disposable sanitary gauge tee with no dead zone for use in pressure measurement of fluid in disposable tubing including a body having a main fluid passageway in fluid connection with a proximal end of a pressure fluid passageway, the main fluid passageway including a fluid port and a second fluid port, wherein a hose barb is operatively attached to the body at the fluid port and the second fluid port, wherein the disposable tubing can be removably attached to the hose barbs, and the pressure fluid passageway including a distal end for removable attachment of a sanitary pressure gauge and a biocompatible gauge protector for isolation of the fluid from the sanitary pressure gauge. No dead zone is achieved within the gauge tee as the proximal end of the pressure fluid passageway is substantially the same diameter as the distal end of the pressure fluid passageway, therein providing a total transfer of fluid within the pressure fluid passageway during fluid flow. A method of measuring pressure of fluid within disposable tubing using the disposable sanitary gauge tee and a method of measuring pressure of fluid in a closed system are further included.

11 Claims, 8 Drawing Sheets

GAUGE TEE DEVICE

CROSS-REFERENCE TO RELATED APPLICATIONS

This application claims the benefit of priority under 35 U.S.C. Section 119(e) of U.S. Provisional Patent Application No. 60/683,091, filed May 20, 2005, which is incorporated herein by reference.

BACKGROUND OF THE INVENTION

1. Technical Field

The present invention relates to the field of tubing and filtration devices and more specifically towards gauges.

2. Background Art

Currently, various devices exist for measuring pressure within disposable tubing because it can be very beneficial to obtain and monitor relevant flow characteristics of fluids passing through the tubing. While methods for obtaining such information have existed for a long time, no reliable low cost systems have been developed for disposable use.

One prior art device for measuring pressure within tubing utilizes disposable pressure sensors with a luer lock fitting, as in U.S. Pat. No. 4,576,181. However, this device can only be used with low flow rates and small tubing sizes. Further, the device requires a computer or electronic interface for the pressure readout. In general, disposable pressure sensors that are provided pre-sterilized have limitations in that they cannot be calibrated before their use. This is a key drawback to use in the biopharmaceutical industry because calibration prior to the use of pressure gauges is required during Good Manufacturing Practices (GMP) production.

Another prior art device is a ¾ inch mini sanitary (stainless steel) gauge tee with hose barb adapters. Although this device can measure pressure within tubing, it is in constant contact with the stainless steel gauge. As a result, contamination of the gauge tee can occur. Furthermore, considerable hold-up volume results (5-50 mL).

Especially when operating in a sterile environment with biologics or pharmaceuticals, minimal hold-up volume is preferred. Hold-up is an amount of fluid in a system that remains stagnant, generally caused by a branch or tee in a line for a valve, gauge, or measuring line. If allowed to remain in place, such hold-up fluid can dilute the end product being produced on a line with a gauge.

Anderson Instrument Co., Inc. describes a zero dead-leg instrument fitting that can be installed on lines as small as ½ inch. The fitting is a tee and can be connected to a gauge or transmitter. The fitting is made of stainless steel, thus the liquid flow is still in contact to stainless steel. The fitting is intended for multiple uses.

U.S. Pat. No. 5,000,049 to Cooper, et al., discloses an apparatus for measuring fluid pressure in a tube of a catheter. The tube can include threads for receiving a gauge. The tube is made of a biocompatible, nonpyrogenic and sterilizable material. A sealing diaphragm is provided between the fluid path and the pressure-sensitive diaphragm, preferably made of polyethylene, polyurethane, polyvinylchloride, or the like. Thus, the diaphragm sends a read-out to a gauge pointer and there is no contact of the fluid with metal. However, such a device could not be used readily in a biopharmaceutical process, as the gauge must be calibrated before and after use. Meeting GMP processing standards is required for processing biopharmaceuticals, and calibrating a gauge after use will jeopardize the batch processed if the calibration fails.

U.S. Pat. No. 6,117,086 to Shulze discloses a physiological pressure transducer coupled to a catheter through a disposable dome containing a shaped, compliant isolation media, which is in intimate contact with the reusable transducer diaphragm. The disposable dome is in the shape of a tee. The isolation media preferably forms inside of all sharp corners around the outer diameter of the diaphragm where it contacts the disposable dome, thus providing an extremely smooth and essentially straight fluid path without the entrapment of bubbles. Again, this device requires a gauge that must be calibrated before and after use, and thus could not be used in biopharmaceutical processes.

U.S. Pat. No. 6,978,636 to Motush, et al., discloses a portable device for measuring refrigerant pressure, including a hose with a first end connected to an actuator on a pressurized container and a second end connectable to a service port of an automobile air conditioner. A T-connector with a check valve and pressure gauge is disposed in the hose. In the preferred embodiment, at least one barb of the T-connector is rotatable and is a separate piece from the body of the T-connector. This enables the T-connector to rotate with respect to the hose so that the pressure gauge will always be viewable by the user. The T-connector is preferably made of die-cast zinc, thus there is metal contact of the fluid. The device interfaces with a threaded pressure gauge and allows fluid to pass up into the body of the gauge. Such a device could not be used in biopharmaceutical processes because the fluid is in contact with the gauge itself, allowing for contamination.

Accordingly, there is a need for a device that can accurately measure pressure of liquids in disposable tubing during various processes. Additionally, there is a need for a disposable device that allows for biopharmaceutical processing and eliminates batch cross contamination or expensive cleaning validation. Further, there is a need for a device that can be sterilized and allows for aseptic pressure monitoring of a process. There is a need for a device that reduces the amount of hold-up volume. Finally, there is a need for a device that provides measurement without product contact to the environment or the stainless steel gauge diaphragm.

BRIEF SUMMARY OF THE INVENTION

The present invention provides a disposable sanitary gauge tee with no "dead zone" for use in pressure measurement of fluid in disposable tubing including a body having a main fluid passageway in fluid connection with a proximal end of a pressure fluid passageway, the main fluid passageway including a fluid port and a second fluid port, wherein a hose barb is operatively attached to the body at the fluid port and the second fluid port, wherein the disposable tubing can be removably attached to the hose barbs, and the pressure fluid passageway including a distal end for removable attachment of a sanitary pressure gauge and a biocompatible gauge protector for isolation of the fluid from the sanitary pressure gauge. To achieve the no dead zone, the proximal end of the pressure fluid passageway is substantially the same diameter as the distal end of the pressure fluid passageway, therein providing a total transfer of fluid within the pressure fluid passageway during fluid flow.

Methods are provided for measuring pressure of fluid within disposable tubing including the steps of removably attaching a disposable sanitary gauge tee to disposable tubing, removably attaching a sanitary pressure gauge and a biocompatible gauge protector to a distal end of the disposable sanitary gauge tee, flowing fluid through the disposable tubing, and measuring the pressure of the fluid.

A method is further provided for measuring the pressure of fluid within a disposable sterile closed system including the steps of removably attaching at least one disposable sanitary gauge tee to disposable tubing, removably attaching a sanitary pressure gauge and a biocompatible gauge protector to each distal end of each disposable sanitary gauge tee, removably attaching at least one fluid device to the disposable tubing flowing fluid through the disposable tubing, measuring the pressure of the fluid, and collecting fluid product in a sterile bag.

BRIEF DESCRIPTION OF THE DRAWINGS

Other advantages of the present invention will be readily appreciated, as the same becomes better understood by reference to the following detailed description when considered in connection with the accompanying drawings, wherein.

DETAILED DESCRIPTION OF THE INVENTION

The present invention provides a new and improved gauge tee device for use in pressure measurement of fluids in disposable tubing. It is particularly useful in disposable sterile systems for filtering biopharmaceuticals.

Like structure among the several defined embodiments are indicated by primed numbers.

Figure 1:
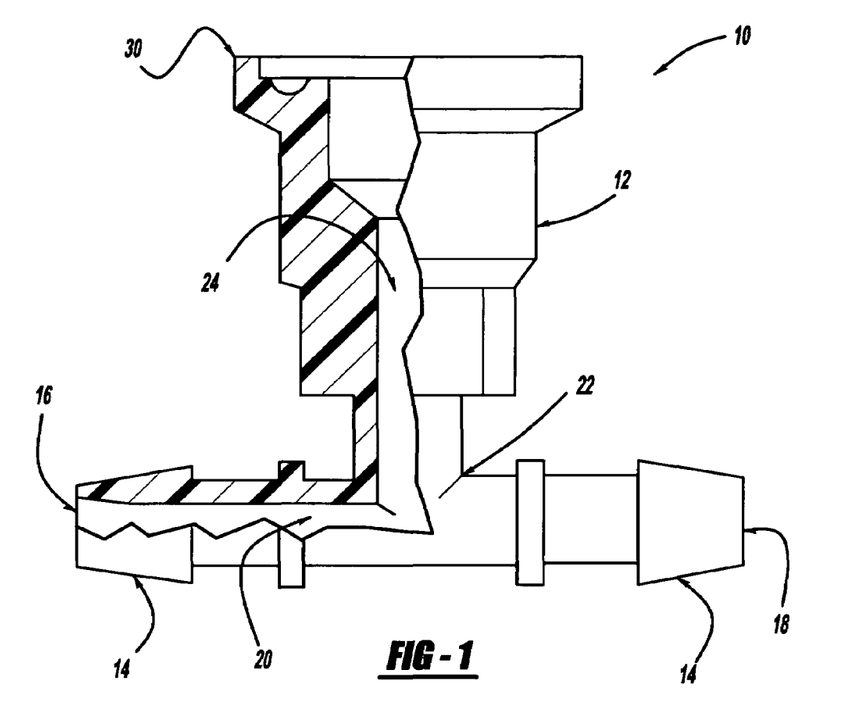
FIG. 1 is a schematic partial cross-sectional view of a first embodiment of a gauge tee device.
Figure 2A:
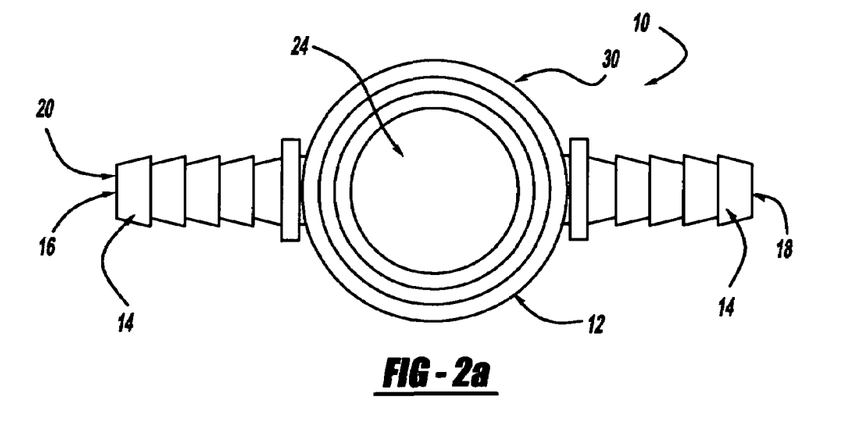
FIG. 2A is a schematic top view and FIG. 2B is a partial cross-sectional view of the first embodiment of the gauge tee device with a height of 1.437 inches and overall length of 3 inches that fits a ¼ inch hose barb and a ¾ inch sanitary pressure gauge.
Figure 2B:
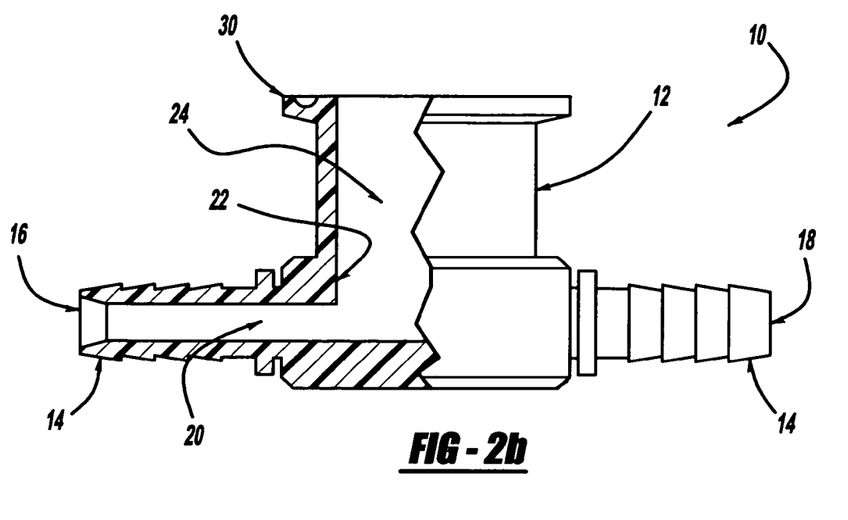
Figure 2C:
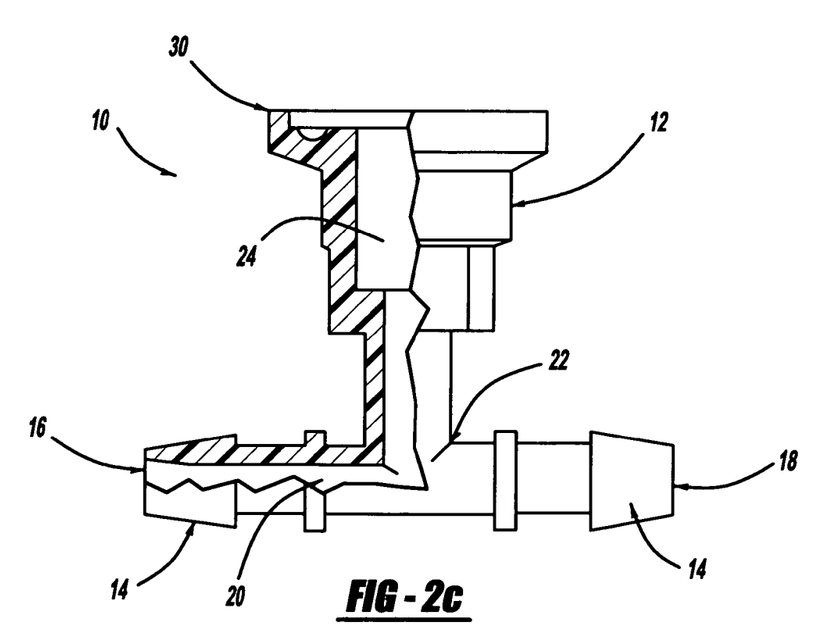
FIG. 2C is a schematic partial cross-sectional view of the first embodiment of the gauge tee device with a height of 1.312 inches and overall length of 1.968 inches that fits a ¼ inch hose barb and a ¾ inch sanitary pressure gauge.
Figure 3:
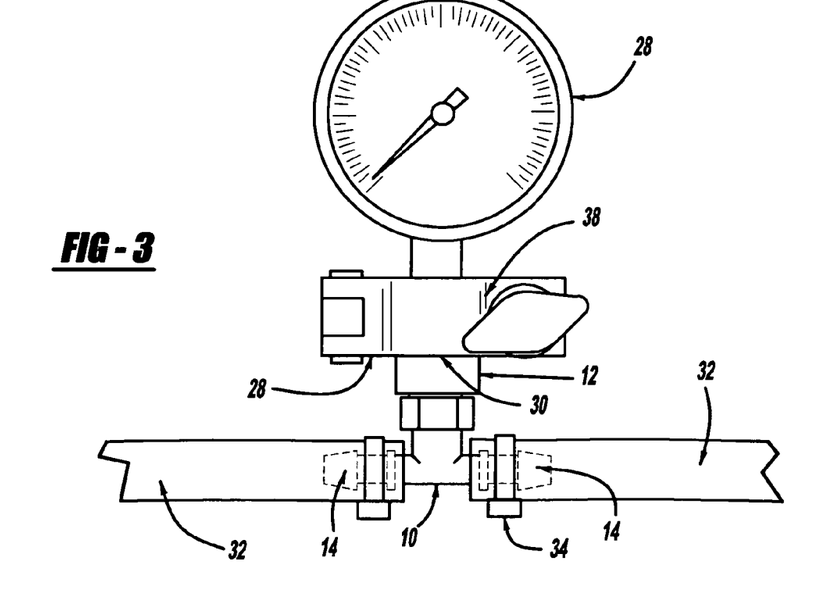
FIG. 3 is a 3-D frontal view of the first embodiment of the gauge tee device with tubing connected to the hose barbs and a sanitary pressure gauge connected to the distal end of the gauge tee.
Figure 4:
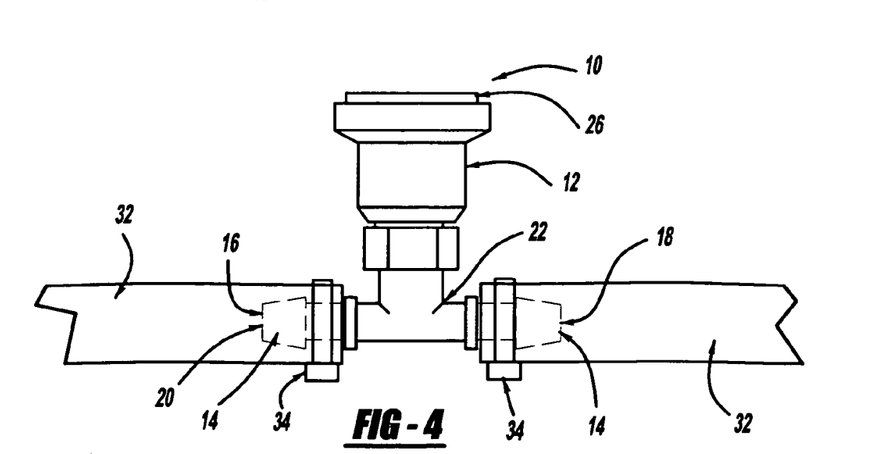
FIG. 4 is a 3-D frontal view of the first embodiment of the gauge tee device with tubing connected to the hose barbs.
Figure 5:
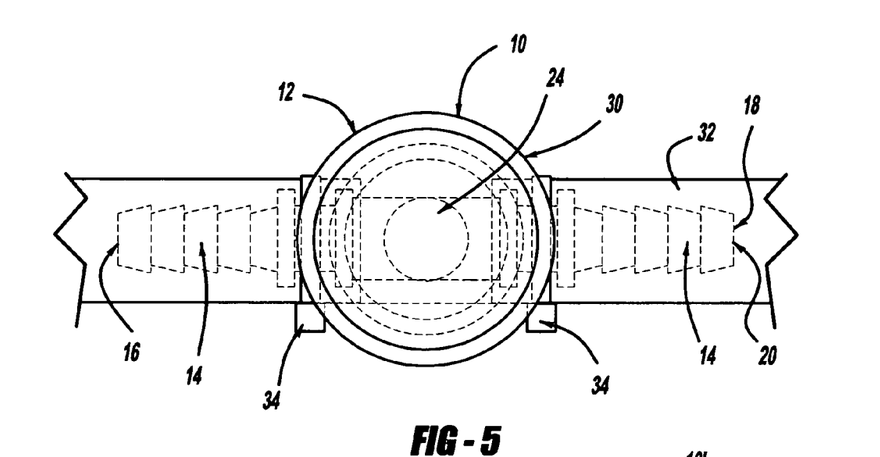
FIG. 5 is a 3-D top view of the first embodiment of the gauge tee device connected to tubing.

Generally, the present invention is a gauge tee device 10, as shown in FIGS. 1, 2A, 2B, and 3, including a mini sanitary gauge tee body 12 in operative connection with hose barbs 14. A first fluid port 16 is in fluid connection with a second fluid port 18 at each hose barb 14 through a main fluid passageway 20. The main fluid passageway 20 is also in fluid connection with a proximal end 22 of a pressure fluid passageway 24. A biocompatible gauge protector 26 and a sanitary pressure gauge 28 can be removably attached to a distal end 30 of the pressure fluid passageway 24 in order to measure the pressure of the fluid. Disposable tubing 32 can be attached to each hose barb 14 to allow liquid to flow through the gauge tee device 10. The biocompatible gauge protector 26, sanitary pressure gauge 28, and disposable tubing 32 can all be used essentially the same in each embodiment described herein. The present invention allows fluid pressure within disposable tubing 32 to be monitored during the filtration of any liquid flowing through the disposable tubing 32. Preferably, a ¾ inch mini sanitary gauge tee body 12 (i.e., the distal end 30 of the pressure fluid passageway 24 has an outer diameter of ¾ inch) with a ¼ inch (outer diameter) hose barb 14 is used with the present invention as shown in FIGS. 2A and 2B.

The present invention has numerous advantages over the prior art. There are very few other ways to measure pressure in disposable tubing other than pressure sensors with attached hose barbs and a digital readout. The present invention provides minimal hold-up volume by utilizing a cup-like design of the pressure fluid passageway, as described below. It can be used in disposable filtration systems for biopharmaceuticals or other liquids. For example, the present invention allows for accurate pressure monitoring of liquids in disposable tubing during bioprocess filtration, chromatography, or other pressure controlled processes. Since the gauge tee device 10 of the present invention can be sterilized, it can be utilized for disposable tubing and bag systems and allows for aseptic pressure monitoring of a process. The gauge tee device 10 of the present invention is disposable, which eliminates the need for cleaning or cleaning validation since it is used only one time (a great benefit for current GMP manufacturing), and eliminates batch cross contamination. The gauge tee device 10 of the present invention is designed specifically for low-pressure filtration applications (<20 psid). Use of BarbLock® (trademark of BarbLock Corporation) technology in the first embodiment allows for sealing of the tubing at the hose barbs with increased pressures.

The present invention provides measurement without product contact to the environment or to a stainless steel gauge diaphragm. The gauge tee device 10 interfaces with a standard sanitary pressure gauge 28 made of stainless steel. In general, the biocompatible gauge protector 26 separates and isolates the fluid from the surface of the diaphragm of the attached sanitary pressure gauge 28. Thus, there is no fluid contact with the sanitary pressure gauge 28. The biocompatible gauge protector 26 can be made of silicone, or other suitable biocompatible materials, and obtained from Rubber-Fab, Inc. This allows for assurance of calibrated process monitoring and validated process parameters. Further, in any of the embodiments, a diaphragm pressure sensor can be used to report pressure to a monitoring device to record digital information. The diaphragm pressure sensor can also be used as feedback control to regulate process flow and pressure.

The present invention has numerous uses. The present invention would be applicable to the biopharmaceutical and pharmaceutical areas where aseptic processing of a drug product is performed. The present invention can be used to manufacture sterile drug products in closed disposable systems for bioprocessing to meet FDA (i.e., GMP) requirements. The gauge tee device 10 can be used in a sterile bag system for aseptic measurement of upstream pressure of validated processes. Further, any of the embodiments of the present invention can be used in aseptic filtration, upstream measurement of chromatography with disposable devices, capsule conditioning/flushing, viral clearance filtration or processes, buffer filtration or flushes, diafiltration, monitoring of air blow-down of process tubing or systems, aseptic downstream pressure measurement of filtration or other validated processes, aseptic measurement of tangential flow filtration (e.g., cell harvesting, perfusion), used with disposable systems for carcinogenic/oncology products, used for product processes for high protein content products or other processes with cleaning validation issues, filter integrity testing, or any other pressure monitored process known to those of skill in the art.

The present invention can be made through numerous methods known to those of skill in the art. In one method, the present invention is fabricated from polymers, Kynar® polyvinylidene fluoride (PVDF) (trademark of Elf Atochem North America, Inc.), plastics, polypropylene or other pharmaceutical grade material known to those of skill in the art. Additionally, the present invention can be sterilized by various methods including, but not limited to, exposure to gamma irradiation, treatment with ethylene oxide, autoclaving (121° C. for 15 minutes), and any other similar methods known to those of skill in the art.

The present invention has numerous embodiments wherein various components or aspects of the present invention are modified without departing from the spirit of the present invention. For example, the various components can be adjusted or modified to accommodate various sized tubing or various sanitary diaphragm gauges (e.g., ¾ inch or 1½ inches sanitary diaphragm gauge) for large scale manufacturing.

In one embodiment, as shown in FIGS. 1, 2A, 2B, 3, 4, and 5, the present invention provides a gauge tee device 10 including a ¾ inch sanitary gauge tee body 12 with ¼ inch hose barbs 14. The first embodiment is essentially described above. The gauge tee device 10 is made from various materials, including, but not limited to, Kynar® PVDF, polypropylene, polymers, and any other similar material known to those of skill in the art. The gauge tee device 10 of the present invention can be inserted into disposable ¼ inch inner diameter tubing 32 made of various materials such as silicone or other polymers. The gauge tee device 10 of the present invention can be secured with a band clamp, cable tie, or other similar securing device 34 known to those of skill in the art. Finally, a ¾ inch sanitary gasket 36 and the gauge can be attached to the gauge tee device 10 by a sanitary clamp 38 or other similar clamp known to those of skill in the art. For processing, a ¾ inch mini sanitary pressure gauge 28 is aseptically attached to the distal end 30 of the gauge tee body 12 with a biocompatible gauge protector 26 separating the product from the diaphragm surface of the sanitary pressure gauge 28. Pharmaceutical fluid can then be aseptically pumped and the pressure monitored during bioprocessing of the liquid. The tubing system is then discarded preventing any cross contamination to subsequent batches of product. The sanitary pressure gauge 28 can be reused since it does not contact the drug product.

As set forth above, the gauge tee device 10 is designed specifically for low-pressure filtration applications of less than 20 psi, which is the typical pressure rating for the type of disposable tubing used. The design can be expanded to accommodate, ⅜ inch or ½ inch inner diameter tubing or any other inner diameter size tubing or to include compression fittings for applications greater than 20 psid.

Figure 6:
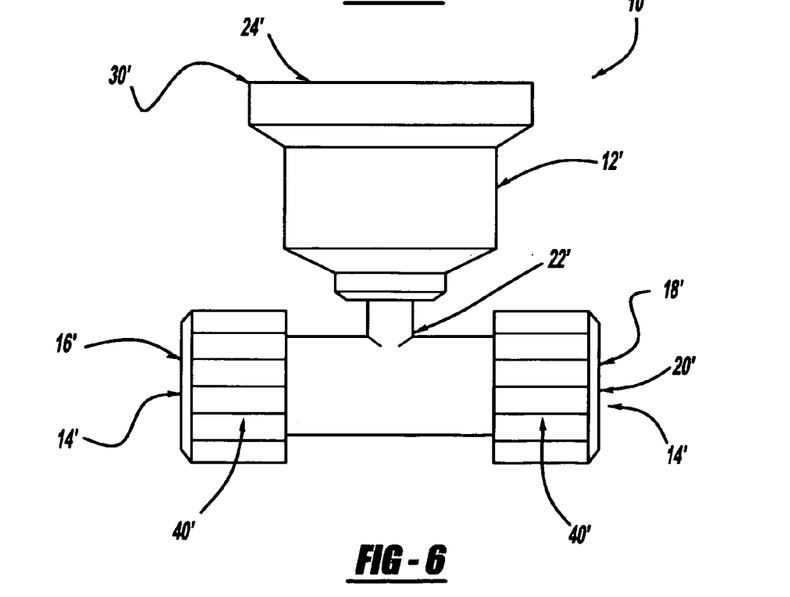
FIG. 6 is a schematic frontal view of a second embodiment of the gauge tee device for use in high pressure (>15 psid) applications.
Figure 7:
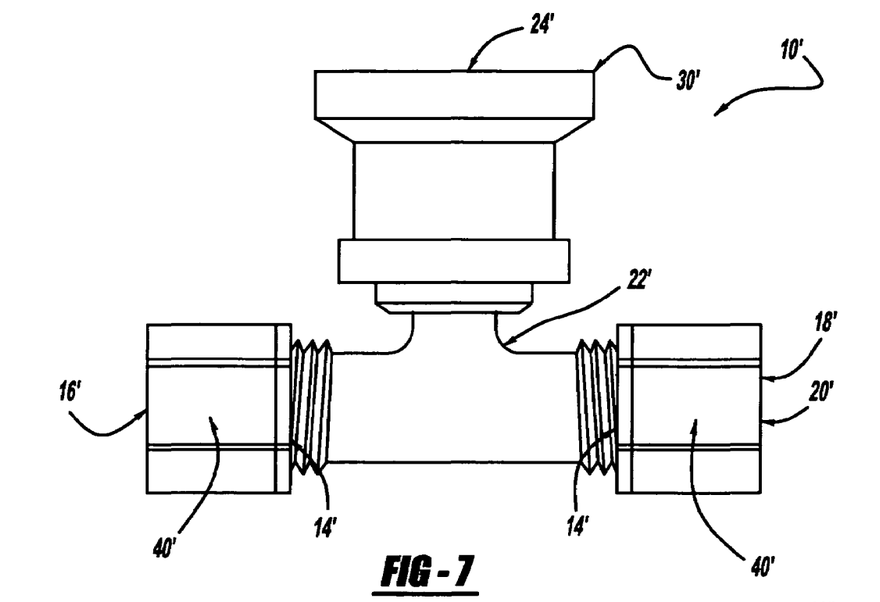
FIG. 7 is a 3-D frontal view of the second embodiment of the gauge tee device for use in high pressure (>15 psid) applications.
Figure 8:
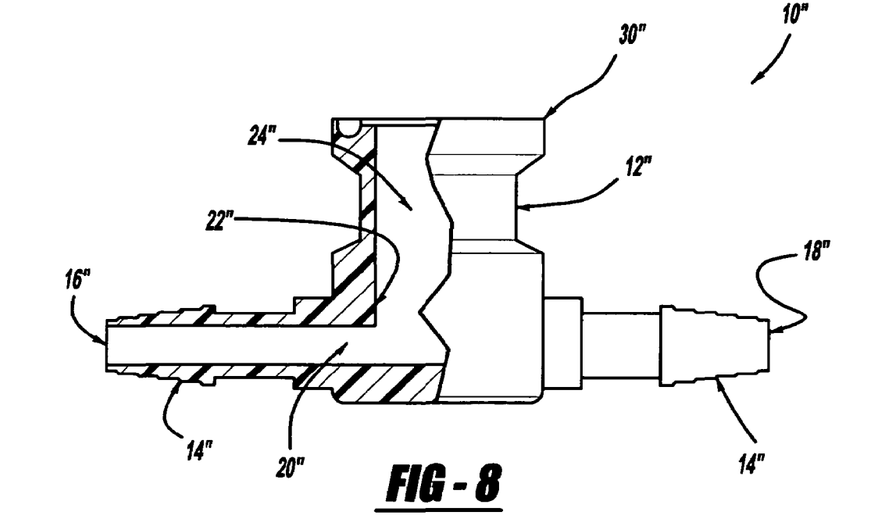
FIG. 8 is a schematic partial cross-sectional view of a third embodiment of the gauge tee with no dead zone.
Figure 9:
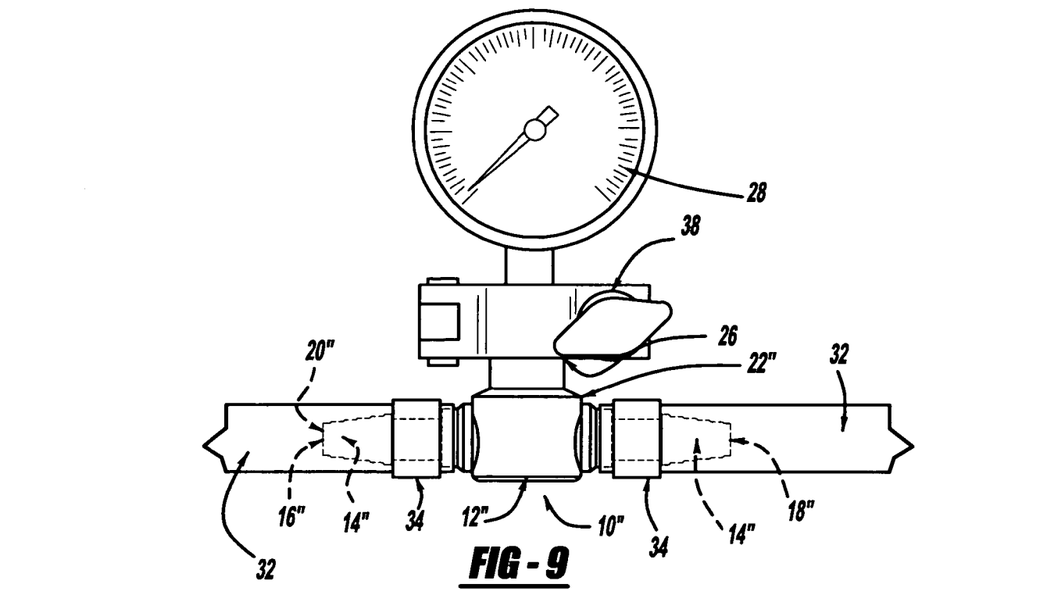
FIG. 9 is a 3-D frontal view of the third embodiment of the gauge tee with no dead zone connected to tubing and a sanitary pressure gauge.
Figure 10:
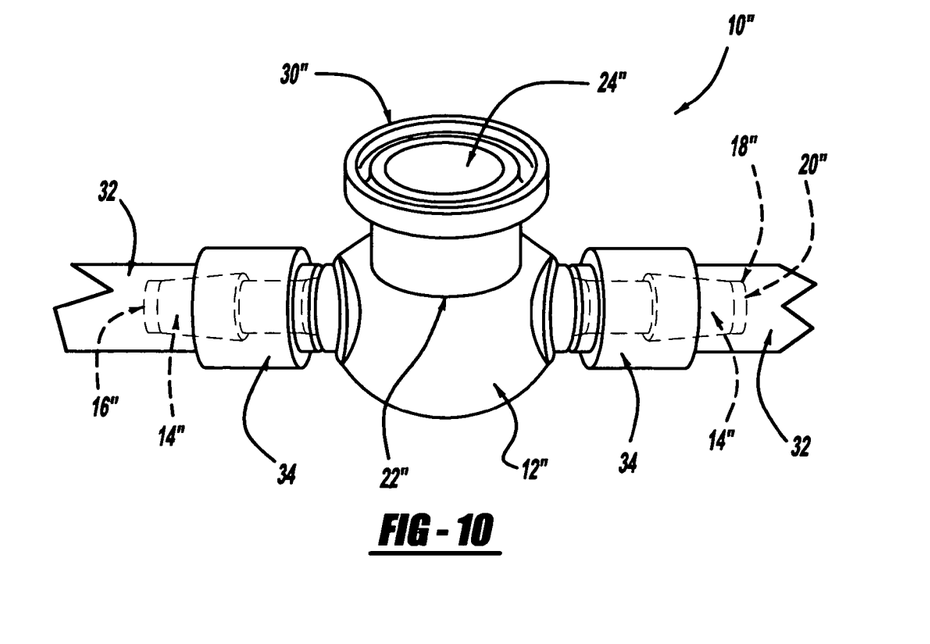
FIG. 10 is a 3-D angled top view of the third embodiment of the gauge tee with no dead zone connected to tubing.
Figure 11:
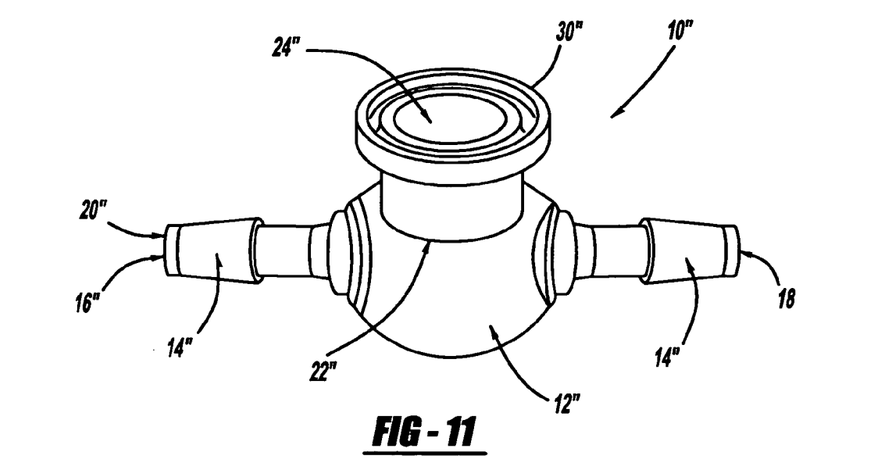
FIG. 11 is a 3-D frontal view of the third embodiment of the gauge tee with no dead zone.

A second embodiment of the gauge tee device 10' is shown in FIGS. 6 and 7 of a ¾ inch disposable sanitary gauge tee including compression fittings 40' that can accommodate ¼ inch inner diameter or ⅜ inch inner diameter disposable tubing 32. This gauge tee device 10' allows pressure to be monitored during fluid processing in disposable tubing. Further, the compression fitting 40' allows for use in systems and/or processes that exert greater than 15 psid. The gauge tee device 10' includes a sanitary gauge tee body 12' in operative connection with compression fittings 14'. A first fluid port 16' is in fluid connection with a second fluid port 18' at each compression fitting 14' through a main fluid passageway 20'. The main fluid passageway 20' is also in fluid connection with a proximal end 22' of a pressure fluid passageway 24'. A biocompatible gauge protector 26 and a sanitary pressure gauge 28 can be removably attached to a distal end 30' of the pressure fluid passageway 24' in order to measure the pressure of the fluid. The compression fitting 40' can be removably attached to a point along the compression fitting 14' that is in contact with the disposable tubing 32. The present invention allows the pressure Within disposable tubing 32 to be monitored during the filtration of any liquid flowing through the disposable tubing 32. This embodiment is a ¾ inch sanitary gauge tee body 12' with a ⅜ inch inner diameter compression fitting 40'. The compression fitting 40' prevents leaks at pressure differences of greater than 15 psid by making a seal between the hose and the disposable tubing 32, which can generally occur with hose barb fittings inserted into tubing.

A third embodiment of the present invention provides for a gauge tee device 10" with no dead zone, as shown in FIGS. 8, 9, 10, and 11. The gauge tee device 10" includes a sanitary gauge tee body 12" in operative connection with hose barbs 14". A first fluid port 16" is in fluid connection with a second fluid port 18" at each hose barb 14" through a main fluid passageway 20". The main fluid passageway 20" is also in fluid connection with a proximal end 22" of a pressure fluid passageway 24". The proximal end 22" is wider in this third embodiment than in the first and second embodiments, creating a cup-like structure above the main fluid passageway 20". The proximal end 22" is almost or substantially the same diameter as the distal end 30" of the pressure fluid passageway 24". This wider design allows all of the fluid in the pressure fluid passageway 24" to drain clean from the pressure fluid passageway 24". The no dead zone is further accomplished in this embodiment by reducing the pressure fluid passageway 24" (i.e., the T space) to be smaller than in the first and second embodiments, where residual fluid can collect. While there is still a tee-like structure, it is not as substantial as in the first two embodiments. A total transfer of fluid is achieved without residual fluid remaining in the gauge tee device 10". Complete flushing of solutions (buffers, etc.) is achieved with the gauge tee device 10" when such solutions are put through the tubing prior to processing a product. A biocompatible gauge protector 26 and a sanitary pressure gauge 28 can be removably attached to a distal end 30" of the pressure fluid passageway 24" in order to measure the pressure of the fluid. Disposable tubing 32 can be attached to each hose barb 14" to allow liquid to flow through the gauge tee device 10". The present invention allows the pressure within disposable tubing 32 to be monitored during the filtration of any liquid flowing through the disposable tubing 32.

In use, the gauge tee device 10, 10', 10" can be hooked up to a line of tubing 32 in order to measure the pressure of the fluid within that line. The tubing 32 is attached at the hose barbs 14, 14', 14" and can be secured by the securing device 34 or compression fittings 40'. The biocompatible gauge protector 26 is placed over the distal end 30, 30', 30" of the pressure fluid passageway 24, 24', 24" to protect the fluid from the metal of the sanitary pressure gauge 28. The sanitary pressure gauge 28 is next attached to the 30, 30', 30" of the pressure fluid passageway 24, 24', 24" and can be secured by the sanitary clamp 38. Fluid is then flowed through the tubing 32 and the pressure of the fluid is monitored by the sanitary pressure gauge 28. Fluid flowing up the pressure fluid passageway 24" in the third embodiment also flows completely out because of the cup-like design, ensuring that no fluid remains to contaminate the process.

Figure 12:
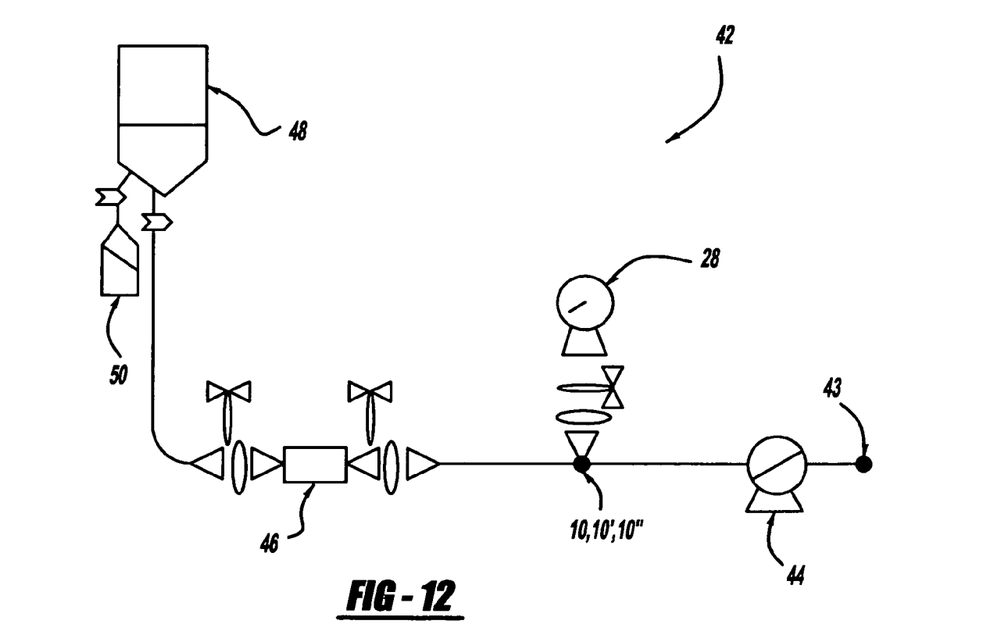
FIG. 12 is a schematic diagram of a sterile bag system using a gauge tee device.
Figure 13:
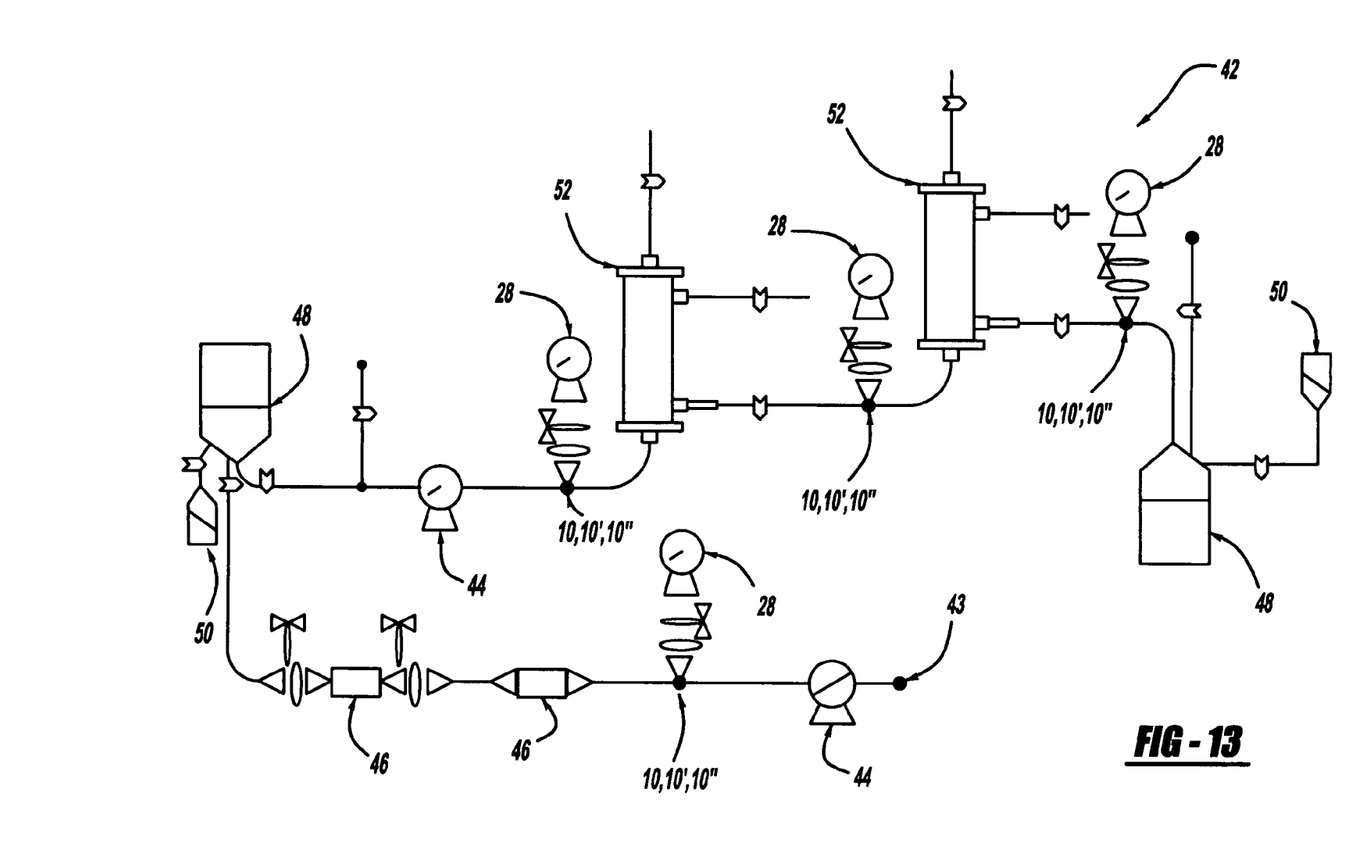
FIG. 13 is a schematic diagram of a sterile bag system using multiple gauge tee devices.

In another embodiment of the present invention, there is provided a closed system 42 for sterile downstream processing, as shown in FIGS. 12 and 13. Sterile fluid enters at a feed entrance 43 and is pumped through a series of disposable tubing 32 and fluid devices 52 such as pumps 44 and filters 46 (removing DNA and viruses) into sterile bags 48 with no contact to the outside environment (i.e., closed and sterile system). Other suitable fluid devices 52 for fluid applications can be used. After processing, the closed system 42 is disposable and the product is stored in a final sterile bag 50 for filling. In this embodiment, the gauge tee device 10, 10', 10" includes a closed silicone gasket, which isolates the fluid from the sanitary pressure gauge 28. A gauge tee body 12, 12', 12" ¼ inch with hose barbs 14, 14', 14" can be used, which is disposable and allows the pressure to be measured in the ¼ inch tubing, which is critical for validated processes. The closed system 42 design allows a sterile biological fluid to be pre-filtered to perform anion exchange and dual virus filtration. Additionally, the sterile biological fluid is retained in the final sterile bag 50. The components of the closed system 42 can undergo gamma irradiation and are disposable. Stainless steel gauge tees could not be used in this type of a process because they are neither gamma-irradiated nor disposable. Any of the embodiments of the gauge tee device 10, 10', 10''' can be used in the closed system 42, thereby allowing for low- and high-pressure applications. Any suitable sterile bags 48, 50 can be used depending upon specific process parameters and the sterile product. Further, any combination or number of gauge tee devices 10, 10', 10", pumps 44, filters 46, fluid devices 52, and sterile bags 48, 50 can be used depending on process parameters. For example, FIG. 12 shows a combination of a single pump 44, gauge tee device 10, 10', 10", filter 46, sterile bag 48, and final sterile bag 50. FIG. 13 shows multiple combinations of these components.

Throughout this application, author and year and patents by number reference various publications, including United States patents. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used, is intended to be in the nature of words of description rather than of limitation.

Obviously, many modifications and variations of the present invention are possible in light of the above teachings. It is, therefore, to be understood that within the scope of the described invention, the invention may be practiced otherwise than as specifically described.

The invention claimed is:

1. A disposable sanitary gauge tee with no dead zone for use in pressure measurement of fluid in disposable tubing comprising:

a body including a main fluid passageway in fluid connection with a proximal end of a pressure fluid passageway;

said main fluid passageway including a fluid port and a second fluid port, wherein a hose barb is operatively attached to said body at said fluid port and said second fluid port, wherein said disposable tubing can be removably attached to said hose barbs;

said pressure fluid passageway including a distal end for removable attachment of a sanitary pressure gauge and a biocompatible gauge protector for isolation of said fluid from said sanitary pressure gauge; and said proximal end of said pressure fluid passageway being substantially the same diameter as said distal end of said pressure fluid passageway, therein providing a total transfer of fluid within said pressure fluid passageway during fluid flow.

2. The disposable sanitary gauge tee of claim 1, wherein said distal end of said pressure fluid passageway has an outer diameter of ¾ inch and said hose barbs have an outer diameter of ¼ inch for attachment to disposable ¼ inch inner diameter tubing.

3. The disposable sanitary gauge tee of claim 2, wherein said body is made from materials chosen from the group consisting of polymers, Kynar® PVDF, plastics, polypropylene, and any other suitable pharmaceutical grade material.

4. The disposable sanitary gauge tee of claim 1, wherein compression fittings are removably attached to an attachment point of said disposable tubing for use in high pressure measurement applications.

5. The disposable sanitary gauge tee of claim 4, wherein said compression fittings accommodate ¼ inch to ⅜ inch inner diameter disposable tubing.

6. The disposable sanitary gauge tee of claim 5, wherein said distal end of said pressure fluid passageway has an outer diameter of ¾ inch and said hose barbs have an outer diameter of ¼ inch for attachment to disposable ¼ inch inner diameter tubing.

7. The disposable sanitary gauge tee of claim 6, wherein said body is made from materials chosen from the group consisting of polymers, Kynar® PVDF, plastics, polypropylene, and any other suitable pharmaceutical grade material.

8. The disposable sanitary gauge tee of claim 1 for use in a process selected from the group consisting of aseptic filtration, upstream management of chromatography with disposable devices, capsule conditioning, capsule flushing, viral clearance filtration or processes, buffer filtration or flushes, diafiltration, monitoring air blow-down of process tubing or systems, aseptic downstream pressure measurement of filtration or validated processes, aseptic measurement of tangential flow filtration, disposable system production of carcinogenic/oncological products, or any other process with cleaning validation issues.

9. A method of measuring the pressure of fluid within disposable tubing, including the steps of:
  removably attaching the disposable sanitary gauge tee with no dead zone of claim 1 to disposable tubing;
  removably attaching a sanitary pressure gauge and a biocompatible gauge protector to a distal end of the disposable sanitary gauge tee;
  flowing fluid through the disposable tubing; and
  measuring the pressure of the fluid.

10. A method of measuring the pressure of fluid within disposable tubing without a dead zone of stagnant fluid, including the steps of:
  removably attaching the disposable sanitary gauge tee of claim 1 to disposable tubing;
  removably attaching a sanitary pressure gauge and a biocompatible gauge protector to a distal end of the disposable sanitary gauge tee;
  flowing fluid through the disposable tubing; and
  measuring the pressure of the fluid.

11. A method of measuring pressure of fluid within a disposable sterile closed system, including the steps of:
  removably attaching at least one disposable sanitary gauge tee of claim 1 to disposable tubing;
  removably attaching a sanitary pressure gauge and a biocompatible gauge protector to each distal end of each disposable sanitary gauge tee;
  removably attaching at least one fluid device to the disposable tubing;
  flowing fluid through the disposable tubing;
  measuring the pressure of the fluid;
  and collecting fluid product in a sterile bag.

* * * * *